Aug. 19, 1930.        J. D. BELL        1,773,340
AIRCRAFT CONSTRUCTION
Filed July 6, 1929
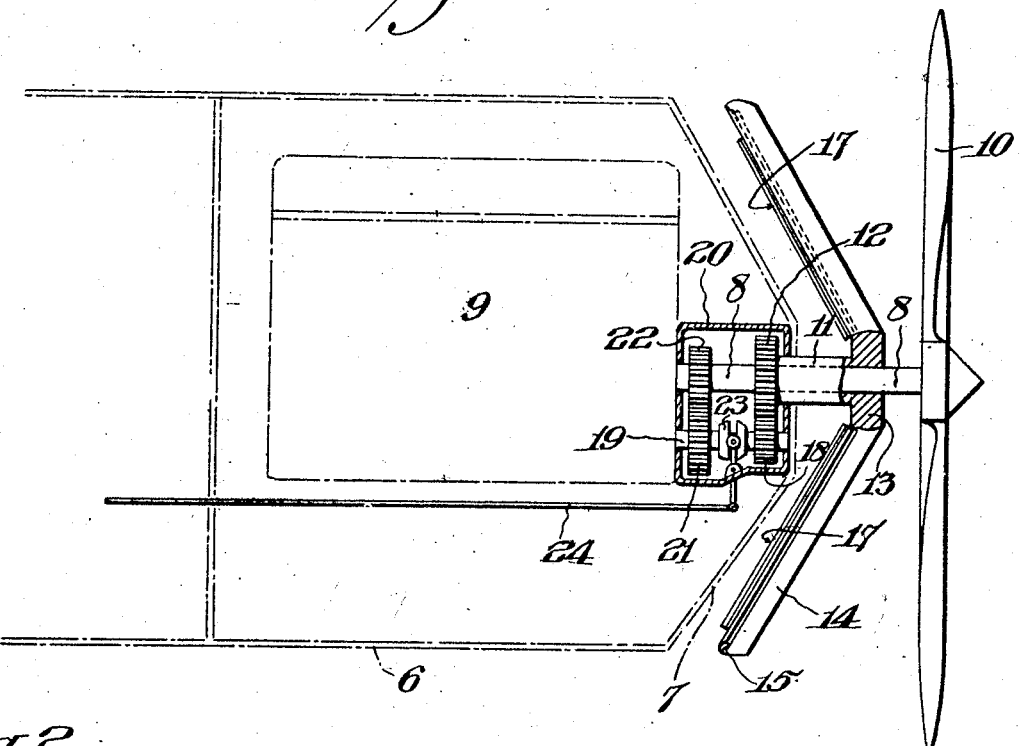
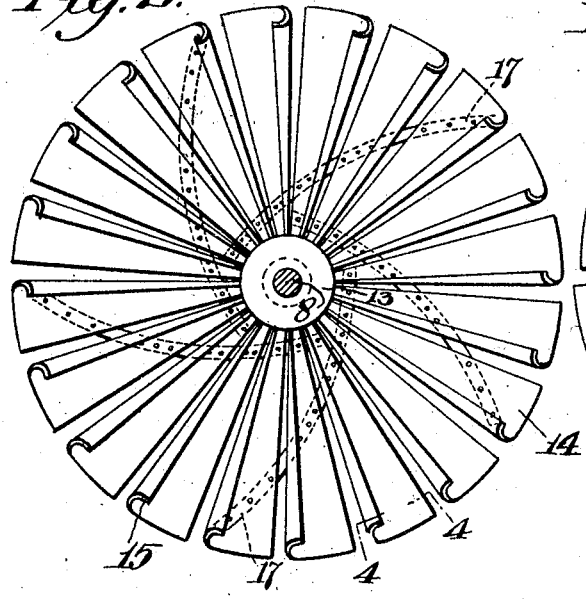
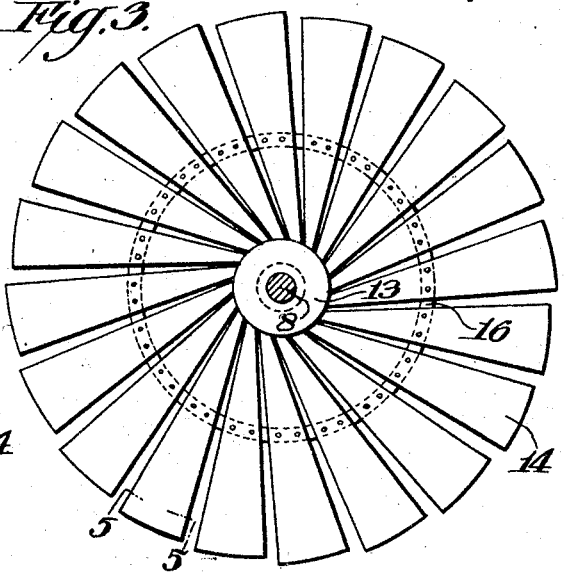
Inventor
Joseph D. Bell,
By Leonard L. Kalish
Attorney.

Patented Aug. 19, 1930

1,773,340

UNITED STATES PATENT OFFICE

JOSEPH D. BELL, OF PHILADELPHIA, PENNSYLVANIA

AIRCRAFT CONSTRUCTION

Application filed July 6, 1929. Serial No. 376,371.

My invention relates to a new and useful construction in aircraft or the like, whereby the energy or power consumed or expended on account of the body resistance of the craft is reduced to a minimum.

In aircraft or the like, one of the great sources of resistance to the travel of the aircraft, is that offered by the front or nose of the fuselage or body of the aircraft.

In order to reduce to a minimum the tractive power required to overcome the resistance offered by the fuselage, I have devised a novel construction, whereby the front of the fuselage which leads into the wind, is provided with a shielding propeller, so constructed and arranged as to be revolved by the air which would normally impinge upon the front of the body of the aircraft or the fuselage. Thus the air which normally impinges upon the front of the body of the aircraft or fuselage is caused to impinge upon a shielding propeller, which may then be operatively connected either with the main drive shaft of the craft or with any auxiliary machinery requiring power, so that the energy otherwise expended is thus reconverted to a large extent into useful power either in propelling the ship or in propelling auxiliary machinery.

Thus according to my novel construction I provide upon any standard fuselage (having any conventional source of motive power and propeller), a novel auxiliary propeller, preferably having its axis of rotation coincident with the axis of the main motor shaft and main propeller, and having its blades inclined rearwardly and immediately adjacent to or in close proximity of the front surface of the fuselage and conforming generally to the shape thereof.

The auxiliary propeller of my novel construction is thus adapted to reclaim and to conserve to some useful end the power or energy normally consumed due to the resistance offered by the front or nose of the fuselage.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in which like reference characters indicate like parts. Figure 1 represents a side elevation, partly in section, of a novel aircraft construction embodying my invention, in which the fuselage and other conventional devices are shown merely diagrammatically.

Figure 2 represents a front elevation of my novel auxiliary propeller.

Figure 3. represents a front elevation of a modified form of my novel auxiliary propeller.

Figure 4 represents a section on line 4—4 of Figure 2.

Figure 5 represents a section on line 5—5 of Figure 3.

The fuselage, of any conventional construction is represented generally by the numeral 6, having the front or leading nose portion 7, through which the main engine or propeller shaft 8 extends longitudinally of the fuselage.

The engine or motor 9 may be of any suitable construction, and likewise the main driving propeller 10 carried at the front end of the shaft 8, may be of any conventional construction.

Upon the main propeller shaft 8 a sleeve 11 is rotatably mounted (upon any suitable bearing), the rear end of which extends into the fuselage, as shown in Figure 1, and carries any suitable gear 12 or the like.

The front end of the sleeve 11 carries the hub 13, which is preferably formed integrally therewith.

The hub 13 carries a series of auxiliary propeller blades 14, either arranged radially as shown in Figure 2, or arranged tangentially with respect to the hub 13, as shown in Figure 3.

Each of the blades 14 is inclined rearwardly at an angle conforming substantially to the angle of the nose 7 of the fuselage 6, and each of said blades is further provided with a pocket or turned over edge 15 along one of the edges thereof, whereby the stream of air may more firmly engage the blade.

The blade 14 may be braced by an annular ring 16, or by spiral braces 17.

The gear 12, carried by the sleeve 11 of the auxiliary propeller hub 13, is in mesh with a gear 18, carried upon a suitable spindle shaft 19 within a suitable gear box 20. The shaft 19 in turn carries the gear 21, which is in mesh with a gear 22 affixed to the main shaft 8. The ratio of the gears 12, 18, 21 and 22 is such as to cause the auxiliary propeller to revolve at a lower speed than the main propeller, in a ratio of 2 to 1, 2 to 3, or any other suitable ratio.

If desired, a clutch 3, of any suitable construction may be operatively interposed between the gears 18 and 21, so that the auxiliary propeller may be disengaged if desired. Any suitable clutch control mechanism 24 may be provided for this purpose.

By reason of the rearward inclination of the propeller blades 14, the air impinging upon the propeller blades is thrown out in a generally radial direction. Enough air passes between the blades however to permit the necessary cooling of the engine (whether air-cooled type or water radiator type).

By my novel construction not only is the resistance of the fuselage greatly reduced, but the power normally consumed to overcome such resistance is converted into useful power in propelling the plane or to be utilized in any other suitable way.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the patent.

Having thus described my invention what I claim as new and desire to secure by Letters Patent, is:—

1. In an aircraft comprising a fuselage having a stream-lined front end portion, a source of power and a propeller, an auxiliary propeller behind said main propeller shaped to conform to the stream-line of the front of the fuselage and shielding the same and being adapted to be revolved by the stream of air impinging thereon.

2. In an aircraft comprising a fuselage having a stream-lined front end portion, a source of power and a propeller, an auxiliary propeller behind said main propeller shaped to conform to the stream-line of the front of the fuselage and shielding the same and being adapted to be revolved by the stream of air impinging thereon, and operatively connected with the propeller shaft, so as to impart to it the power derived from the air impinging upon said auxiliary propeller.

3. In a fluid supported vehicle, comprising a body having a stream-lined front end portion, a source of power and a fluid propeller for locomotion of the vehicle, an auxiliary propeller behind said main propeller shaped to conform to the stream-line of the front of the fuselage and shielding the front of the body of the vehicle and being adapted to be revolved by the stream of fluid impinging therein, and operatively connected with the main propeller shaft, so as to impart to it the power derived from the fluid impinging upon said auxiliary propeller.

In testimony whereof, I have hereunto set my hand and seal this 6th day of July, 1929.

JOSEPH D. BELL.